(12) United States Patent
Mössinger

(10) Patent No.: US 12,337,267 B2
(45) Date of Patent: Jun. 24, 2025

(54) FILTER WITH A REPLACEABLE FILTER ELEMENT HAVING A LOCKING MEMBER

(71) Applicant: Elsässer Filtertechnik GmbH, Nufringen (DE)

(72) Inventor: Klaus Mössinger, Nufringen (DE)

(73) Assignee: Elsässer Filtertechnik GmbH, Nufringen (DE)

( * ) Notice: Subject to any disclaimer, the term of this patent is extended or adjusted under 35 U.S.C. 154(b) by 459 days.

(21) Appl. No.: 17/875,788

(22) Filed: Jul. 28, 2022

(65) Prior Publication Data
US 2023/0031982 A1 Feb. 2, 2023

(30) Foreign Application Priority Data

Jul. 29, 2021 (DE) ...................... 10 2021 119 795.3

(51) Int. Cl.
*B01D 35/30* (2006.01)
*B01D 27/08* (2006.01)
*B01D 46/24* (2006.01)
*B01D 46/88* (2022.01)

(52) U.S. Cl.
CPC ........... *B01D 35/306* (2013.01); *B01D 27/08* (2013.01); *B01D 46/2414* (2013.01); *B01D 46/88* (2022.01); *B01D 2201/4092* (2013.01); *B01D 2265/06* (2013.01); *B01D 2271/027* (2013.01)

(58) Field of Classification Search
CPC ................. B01D 35/306; B01D 27/08; B01D 2201/4092; B01D 2271/027; B01D 2265/06
See application file for complete search history.

(56) References Cited

U.S. PATENT DOCUMENTS

| 8,038,756 | B2 * | 10/2011 | Iddings .............. B01D 46/0004 210/450 |
| 9,132,367 | B2 * | 9/2015 | Honermann ........... B01D 29/21 |
| 2008/0190082 | A1 * | 8/2008 | Scott .................. F02M 35/0201 55/520 |
| 2020/0155988 | A1 * | 5/2020 | Campbell .......... B01D 46/0005 |

FOREIGN PATENT DOCUMENTS

| DE | 102005006880 A1 | 9/2005 |
| DE | 102009035033 A1 | 2/2011 |
| DE | 102014012579 A1 | 3/2016 |

(Continued)

*Primary Examiner* — Robert Clemente
*Assistant Examiner* — Rachel Marie Slaugenhaupt
(74) *Attorney, Agent, or Firm* — David L. Nocilly; Bond Schoeneck & King PLLC

(57) ABSTRACT

A filter comprising a filter housing (10) and a replaceable filter element (12) arranged in the filter housing (10) and having annular upper and lower end members (12a, 12b) and an inner space, wherein the filter housing (10) comprises a housing pot (10a) having a fluid in-let (10e), a fluid outlet and an opening (10b) for inserting the filter element (12). The filter has a support tube (16) extending in the inner space of the filter element (12) and connected to a bottom of the filter housing (10) and a locking member (14), the locking member (14) being adapted to engage the support tube (16) and generate a holding or pushing or pulling force supported on the filter housing via the support tube (16) for holding or pushing or pulling the filter element (12) into or out of the housing bowl (10a).

13 Claims, 10 Drawing Sheets

(56) References Cited

FOREIGN PATENT DOCUMENTS

Figure 1:
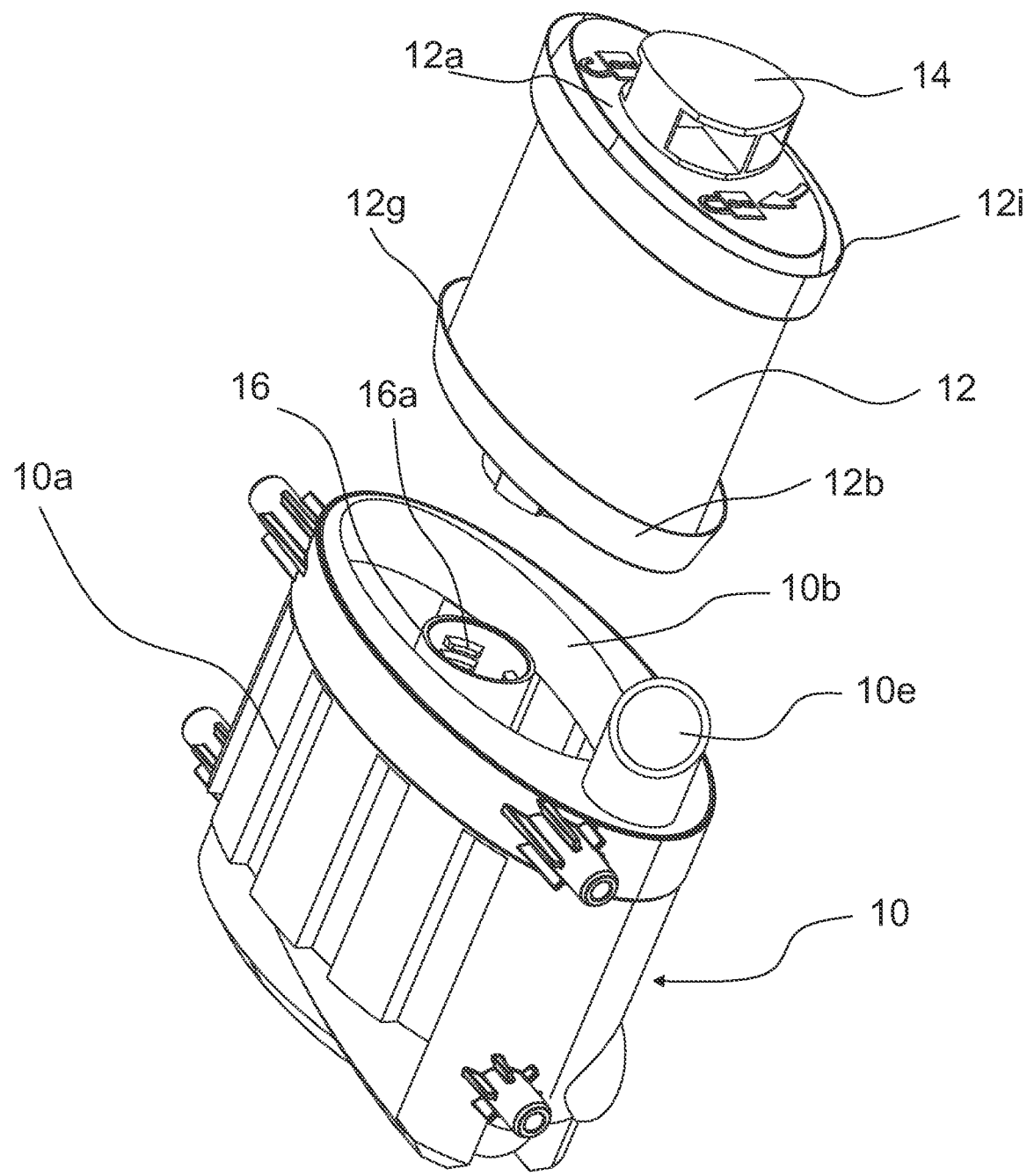

| | | |
|---|---|---|
| DE | 102016003454 A1 | 10/2016 |
| DE | 102015007182 A1 | 12/2016 |
| DE | 102019108955 A1 | 10/2020 |
| WO | WO-2013107572 A1 * | 7/2013 ............ B01D 29/96 |
| WO | WO-2020201478 A1 * | 10/2020 |

* cited by examiner

FILTER WITH A REPLACEABLE FILTER ELEMENT HAVING A LOCKING MEMBER

CROSS-REFERENCE TO RELATED APPLICATIONS

The present application claims priority to German Patent Application No. DE 10 2021 119 795.3, filed on Jul. 29, 2021.

BACKGROUND OF THE INVENTION

The invention relates to a filter according to the preamble of claim 1 and to a filter element.

Various types of air filters with filter housings and replaceable filter elements are known from the prior art. The filter housings comprise a housing cover, which must be removed for insertion and replacement of the filter element, and which is fastened to a housing pot by means of clips.

Filter elements generally comprise an upper and a lower end element, a support tube and a filter fleece wound onto the support tube. According to the prior art, the filter fleece is glued to the upper and lower end elements.

The document DE 10 2015 007 182 A1 discloses a filter according to the preamble of claim 1. Further generic filters are disclosed in the documents DE 10 2005 006 880 A1, DE 10 2019 108 955 A1, DE 10 2009 035 033 A1, DE 10 2014 012 579 A1 and DE 10 2016 003 454 A1.

The invention is based on the problem of providing a filter with a filter element that is particularly easy to manufacture and to replace.

BRIEF SUMMARY OF THE INVENTION

The problem is solved by a filter with the features of claim 1 and a filter element with the features of claim 13. Advantageous embodiments of the invention are defined in the dependent claims.

The invention relates to a filter with a filter housing and a replaceable filter element arranged in the filter housing with an annular upper and lower end element and an interior space, where-in the filter housing comprises a housing pot with a fluid inlet, a fluid outlet and an opening for inserting the filter element.

It is proposed to provide the filter with a support tube extending in the interior space of the filter element and connected to a bottom of the filter housing, and a locking element, the locking element being adapted to engage the support tube and thereby generate a holding or pushing or pulling force supported via the support tube on the filter housing for holding or pushing or pulling the filter element into or out of the housing pot. This allows the filter element to be conveniently mounted in the housing pot together with the housing cover by means of a central locking element, without having to provide space for access to clips or the like provided at the outer edge of the housing cover for fastening a housing cover.

It is further proposed that the locking element and the support tube have interlocking threads that translate a rotational movement of the locking element into the thrust force. In contrast to other designs of the locking element, for example as a bayonet catch or with an eccentric lever, this makes it possible to generate a well-dosed holding or thrust force. In a particularly advantageous embodiment of the invention, the locking element has a torque-limiting mechanism.

According to a further embodiment of the invention, it is proposed that the upper end element of the filter element forms a housing cover for closing the opening. This may eliminate the need for a separate housing cover and may reduce the number of components.

The support tube may be formed integrally with the housing cup or may be screwed to a bottom of the housing cup.

The invention is particularly advantageous for air filters of in-ternal combustion engines, but can also be used for other air-gas or fluid filters.

In an advantageous embodiment of the invention, it is proposed that the upper end element supports the filter element radially outwardly in the housing. Support on an outlet connection and resulting adhesion of the filter element to the outlet connection can thus be avoided.

Further cost-saving potential can be realized if the upper end element comprises a sealing lip formed from a material of the housing cover and extending radially outward. A separate sealing lip made of rubber or foam can be omitted. The inventors have found that sealing lips made of hard, non-porous plastics, such as those used to manufacture filter housings, can also develop a surprisingly good sealing effect.

In a particularly advantageous embodiment of the invention, the material of the upper end element is a reinforced, non-porous plastic, for example PA6 GF30 or PP TV 20.

Compared to conventional sealing lips made of elastomers, the material of the sealing lips according to the invention has a high-er stiffness or a larger modulus of elasticity. The modulus of elasticity of typical elastomers such as NBR, PU, MVQ, TPU is 6.5-18 N/mm2.

Reinforced materials, in particular thermoplastics, are preferably used for end caps or end elements with sealing lips, especially for temperature reasons in internal combustion engines. Advantageous materials are PP-TV 20, PP-GF20, PA-GF30 with a modulus of elasticity of 2500-9000 N/mm2.

In a further development of the invention, it is proposed that the plastic of the end element with an elastic sealing lip of the filter elements according to the invention is the same material from which the housing of the filter is made, against which the sealing lip lies in a sealing manner in the installed state, i.e. it corresponds to the partner material to be sealed (housing), or a material with almost the same expansion coefficient. Only in this way is it possible to keep the compression between the sealing lip and the sealing partner constant over the entire temperature range. The coefficient of linear expansion is advantageously in the range between 0.26×10−6/K, the coefficient of linear expansion of PA6-GF30, and 100×10−6/K, the coefficient of linear expansion of PP-TV20. In comparison, the coefficient of linear expansion of rubber is about 160–220×10−6/K.

Another advantage of the invention is that when plastic is pressed onto plastic during assembly, only low assembly forces are generated due to the low coefficient of friction compared to elastomer-plastic friction pairings. When the joint is released, the breakaway force (static friction) of plastic-to-plastic joints is much lower compared to elastomer-to-plastic friction pairings. Unlike rubber materials, plastics do not tend to stick.

The static friction coefficient $\mu$ for the plastic-plastic material pairing is 0.3-0.4, while the static friction coefficient $\mu_{rubber}$ for the plastic-rubber material pairing is about 0.8.

In an elastic sealing lip according to the invention, the length/wall thickness ratio is advantageously between 5 and 100. In an advantageous embodiment, the wall thickness at the base of the sealing lip is 0.5-4 mm. The wall thickness at the sealing lip tip is preferably 0.2-2 mm. The angle of the sealing lip is preferably 1-30°.

It is further proposed that the sealing lip has a fold in the profile, which acts like a spring leg and increases elasticity.

It is also proposed that the filter element be provided with a connecting tube for connecting the upper and lower end elements. The mechanical connection therefore does not have to be made via the support tube.

The number of components can be further reduced if the connecting tube is formed in one piece with the upper or lower terminating element.

It is further proposed that the filter element comprises a main body and a locking element rotatably mounted in the housing cover. The locking element has a first thread extending into the interior of the filter housing and the housing cup comprises an inner support tube with a second thread. The second thread is adapted to engage the first thread and connect the filter element to the housing pot. This allows for easy and secure installation or replacement of the filter element.

Further features and advantages will be apparent from the following description of the figures. The entire description, the claims and the figures disclose features of the invention in specific embodiments and combinations. The person skilled in the art will also consider the features individually and combine them in-to further combinations or sub-combinations to adapt the invention, as defined in the claims, to his needs or to specific fields of application.

BRIEF DESCRIPTION OF THE SEVERAL VIEWS OF THE DRAWING(S)

Figure 2:
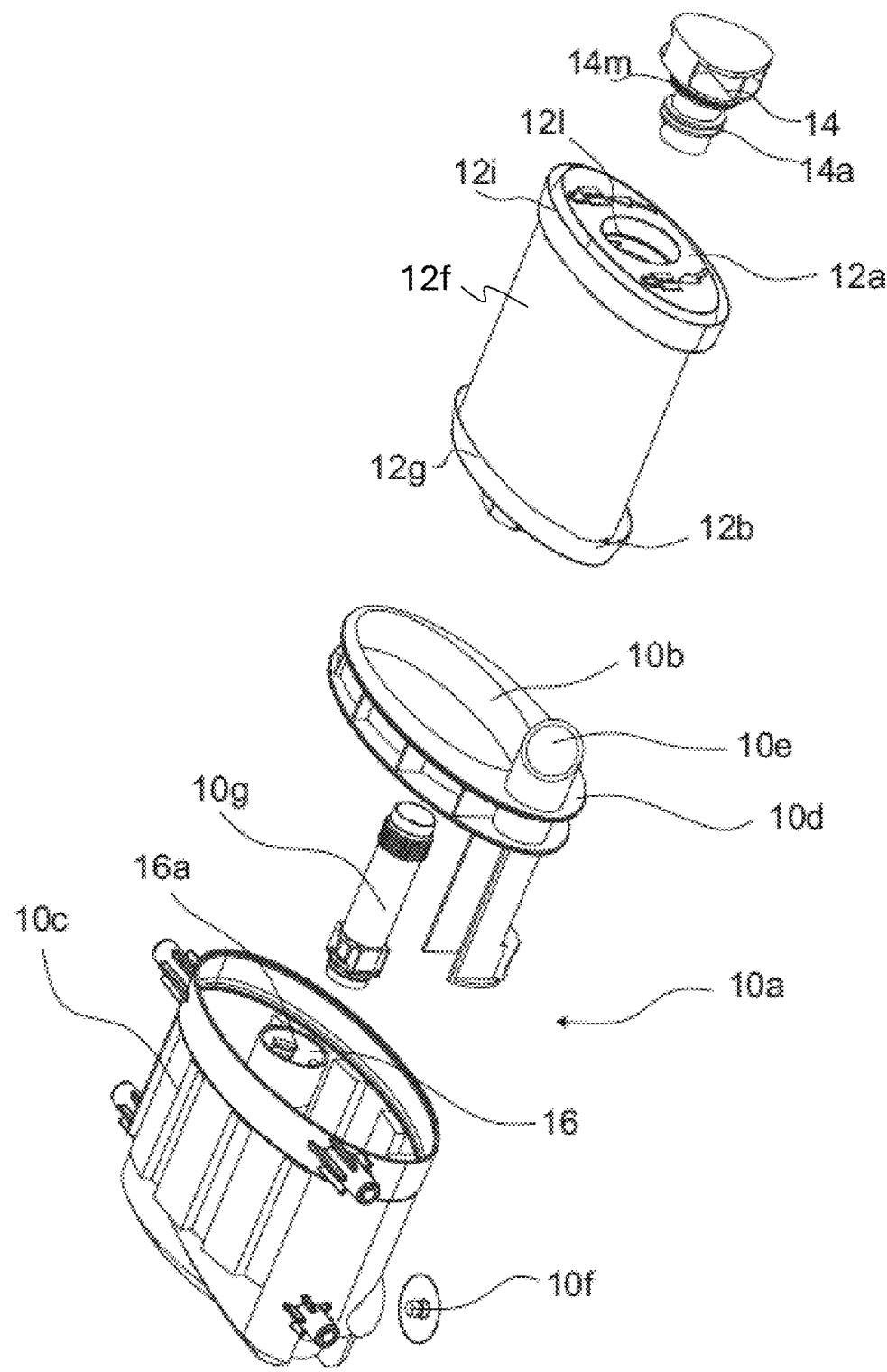
Figure 3:
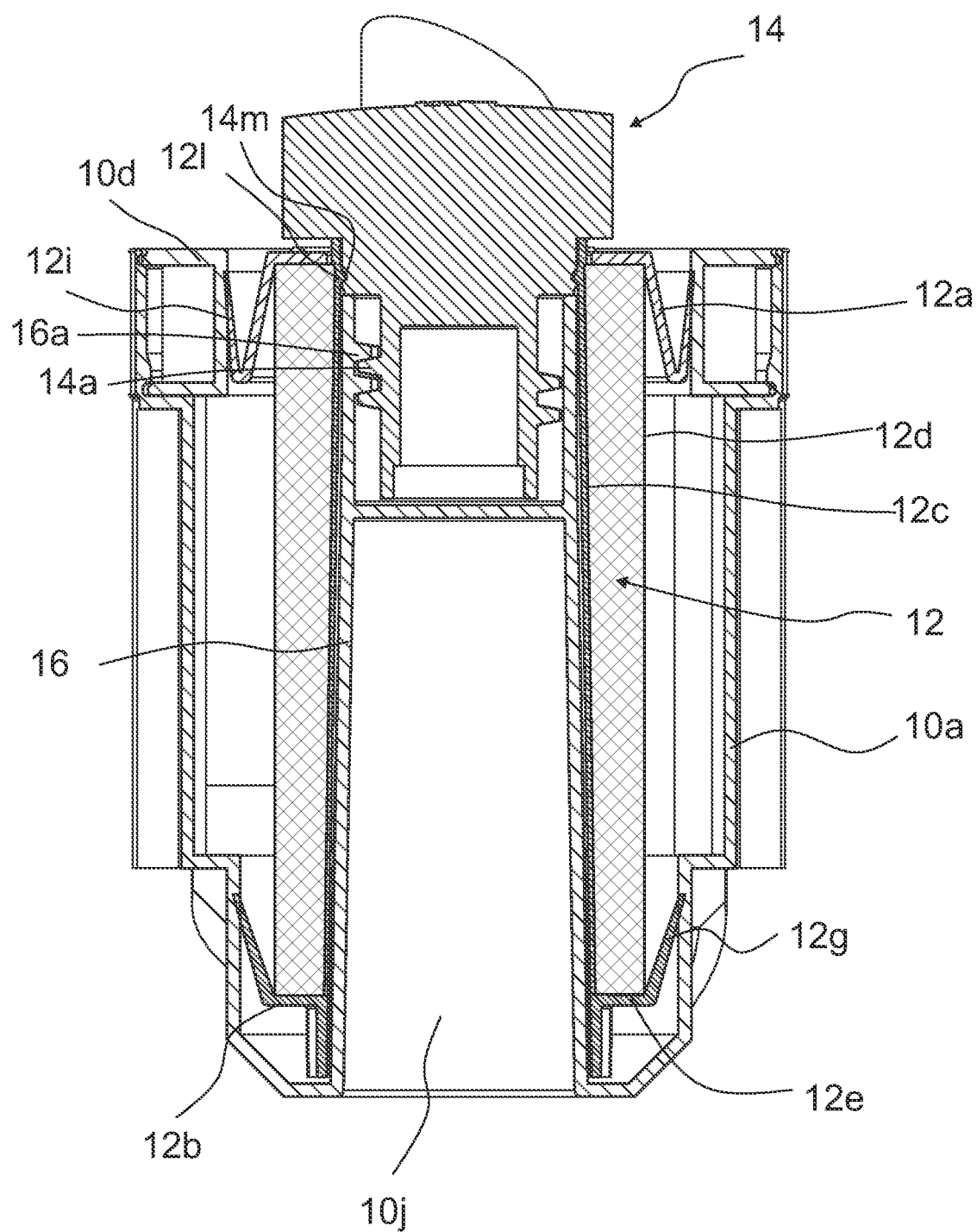
Figure 4:
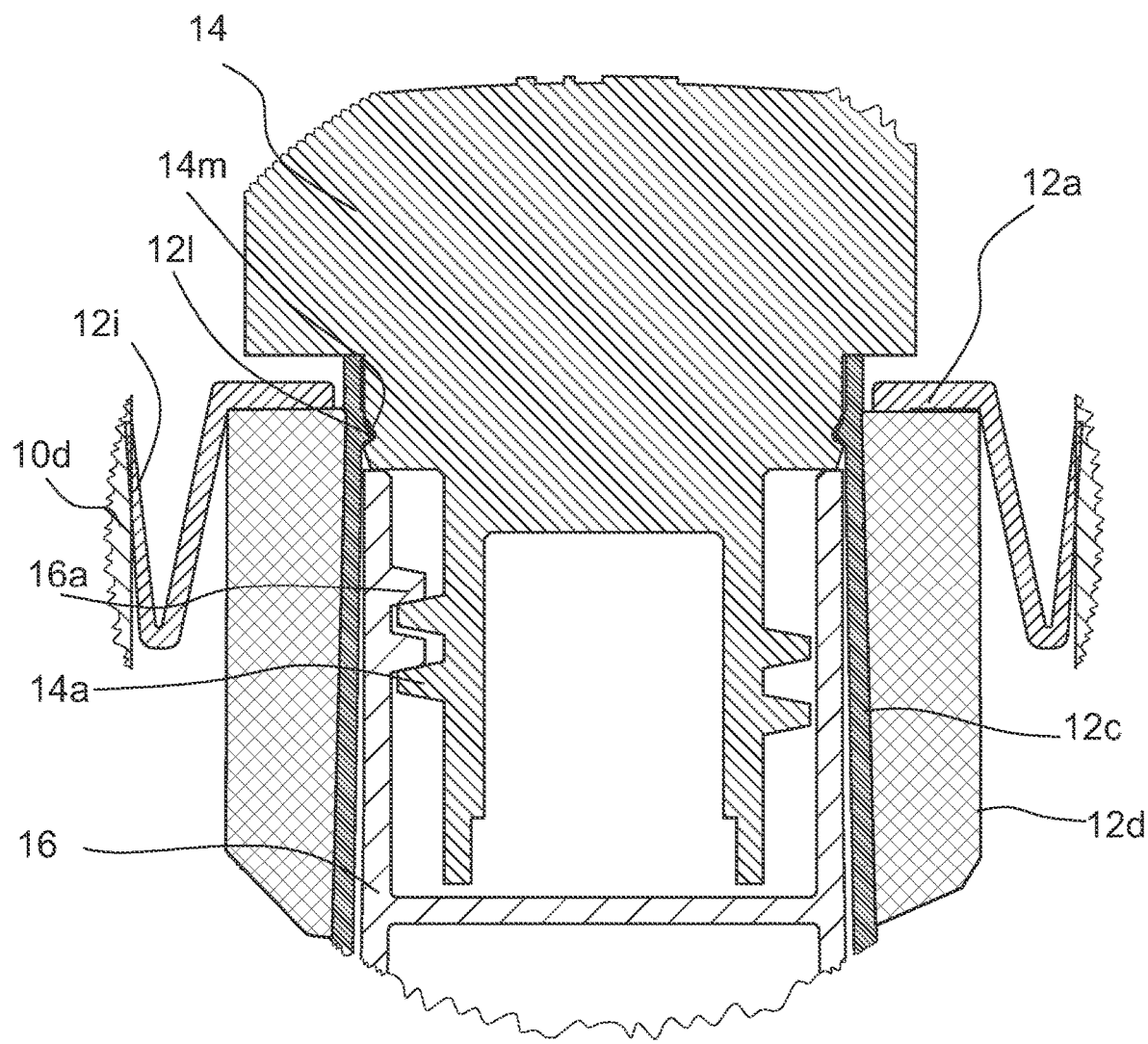
Figure 5:
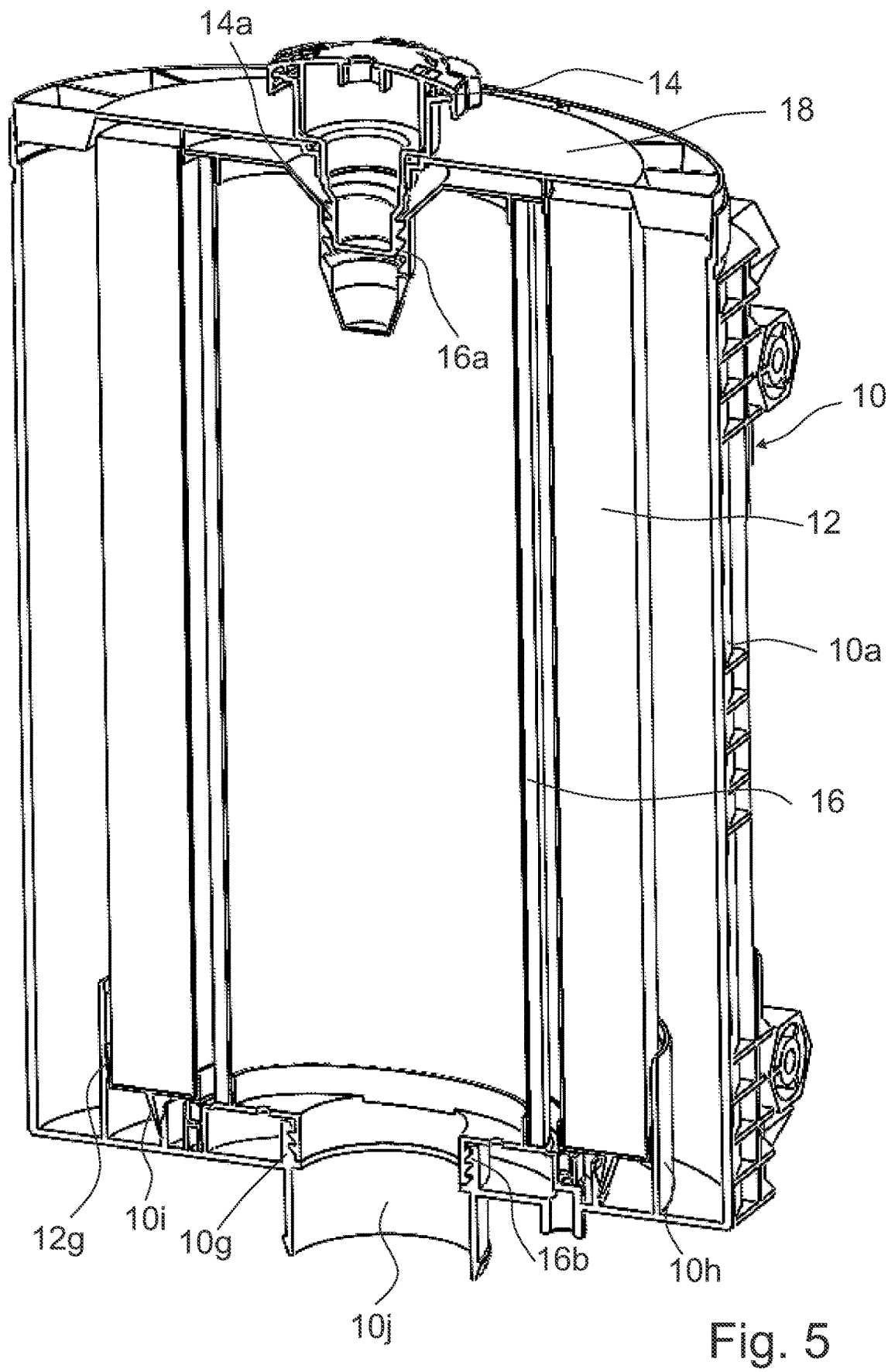
Figure 6:
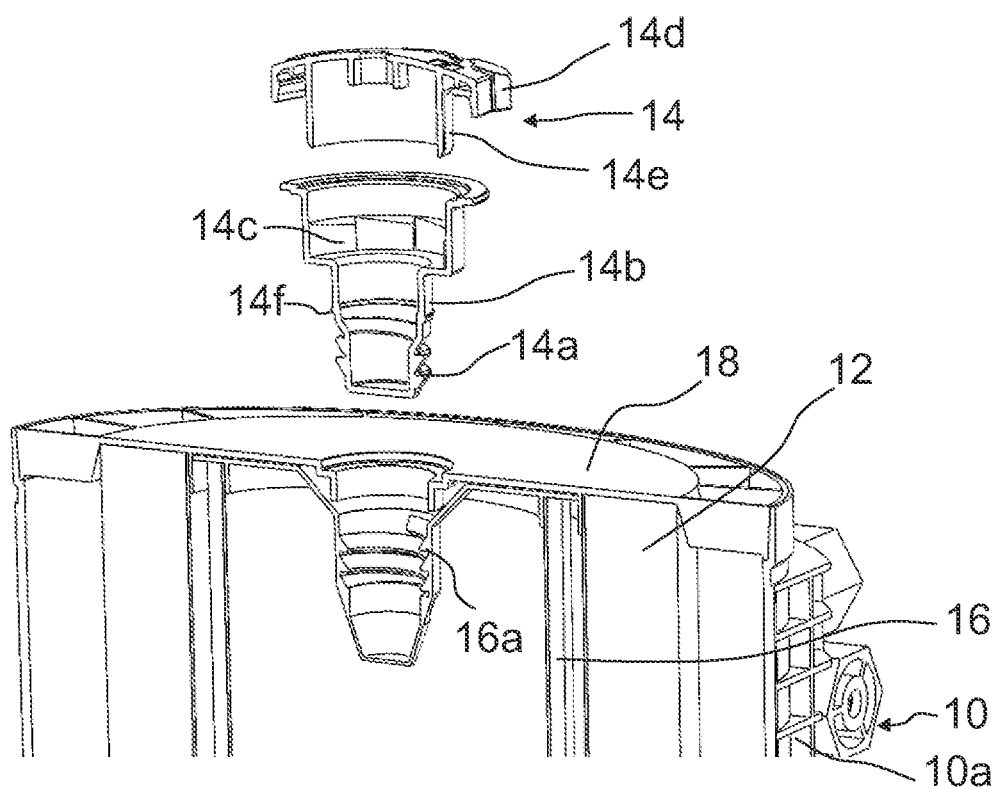
Figure 7:
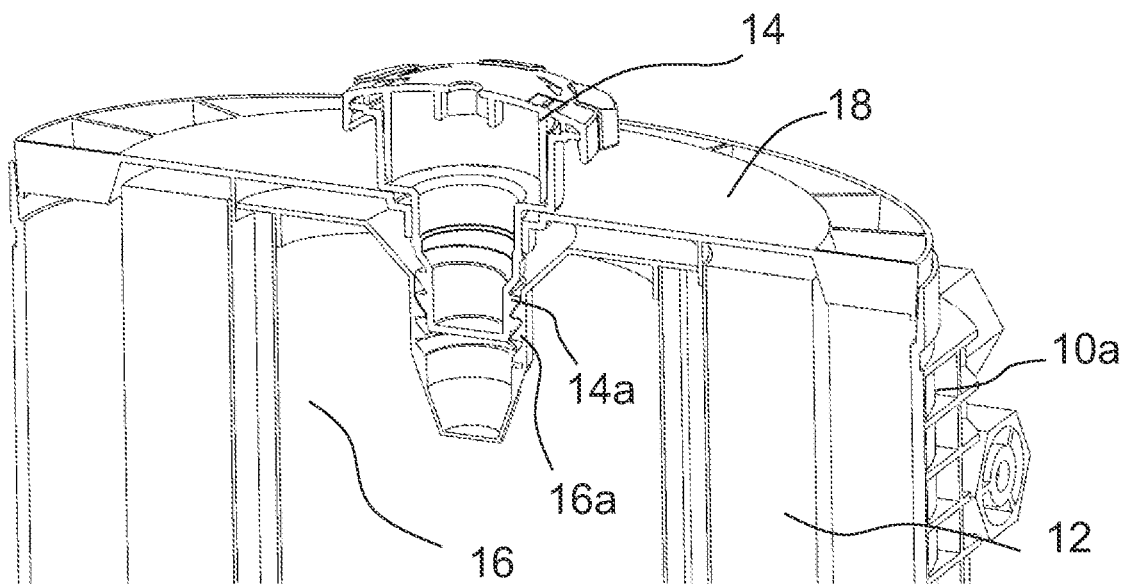
Figure 8:
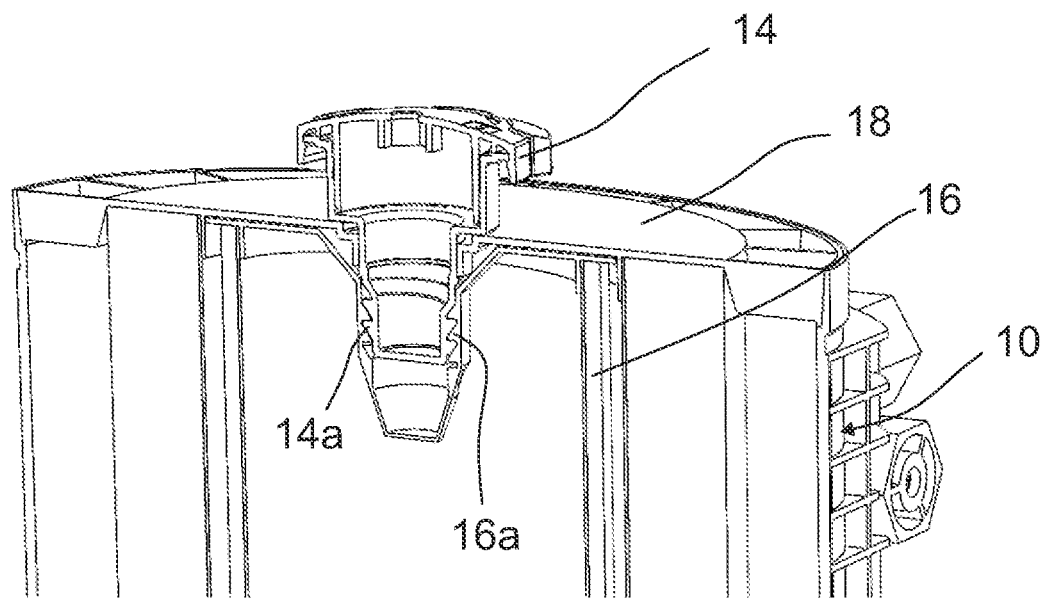
Figure 9:
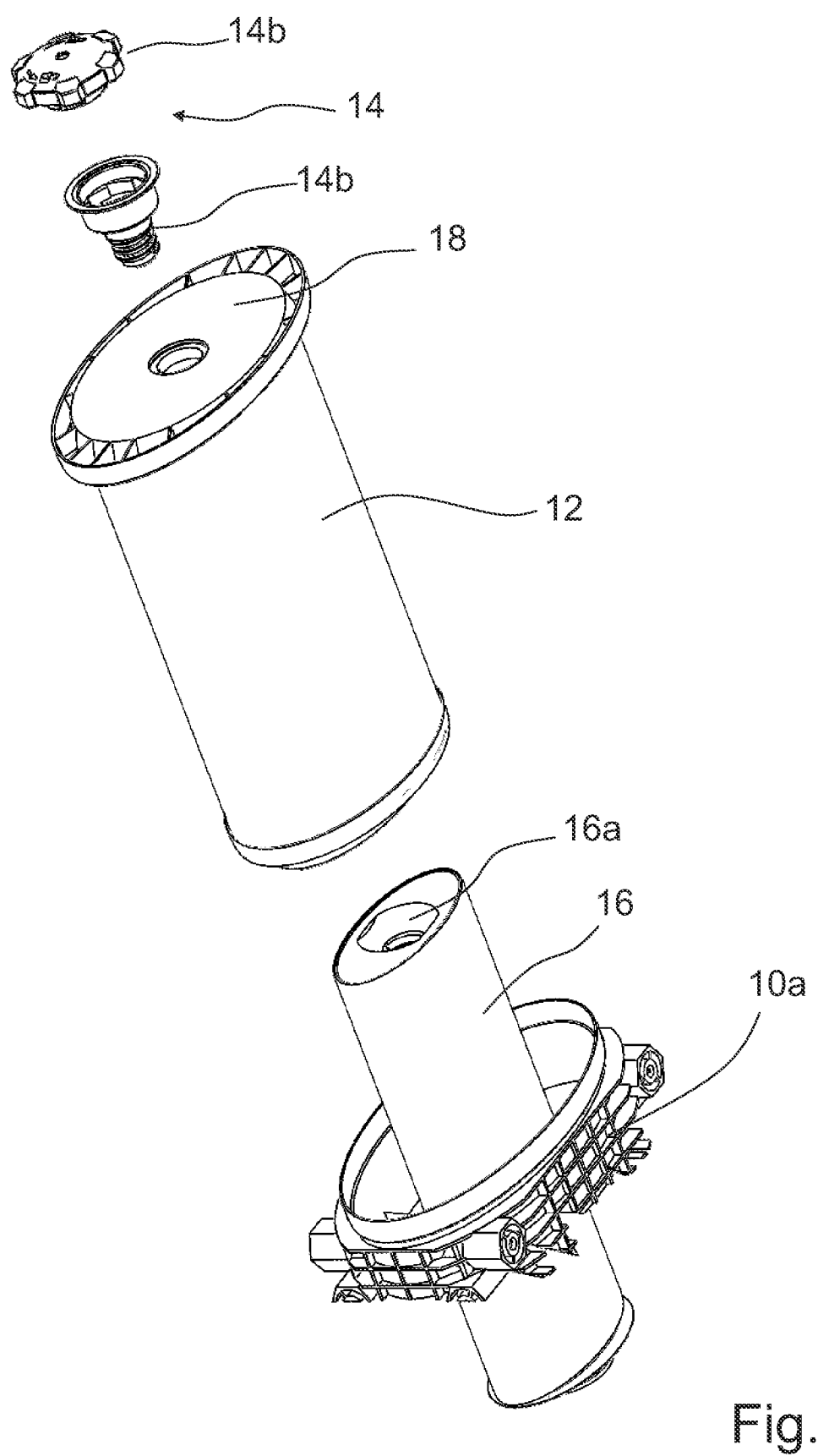
Figure 10:
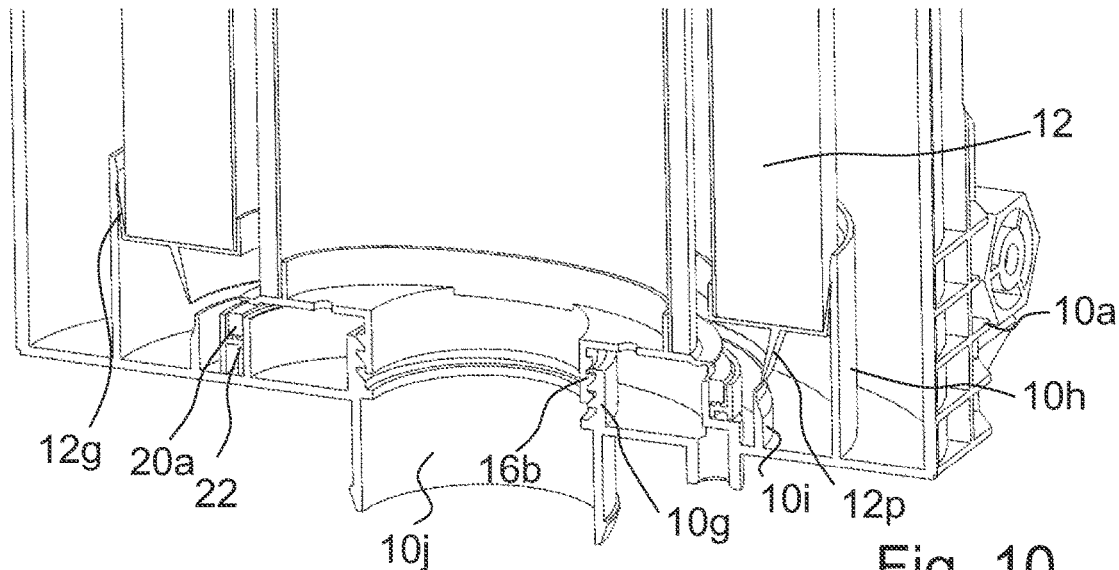
Figure 11:
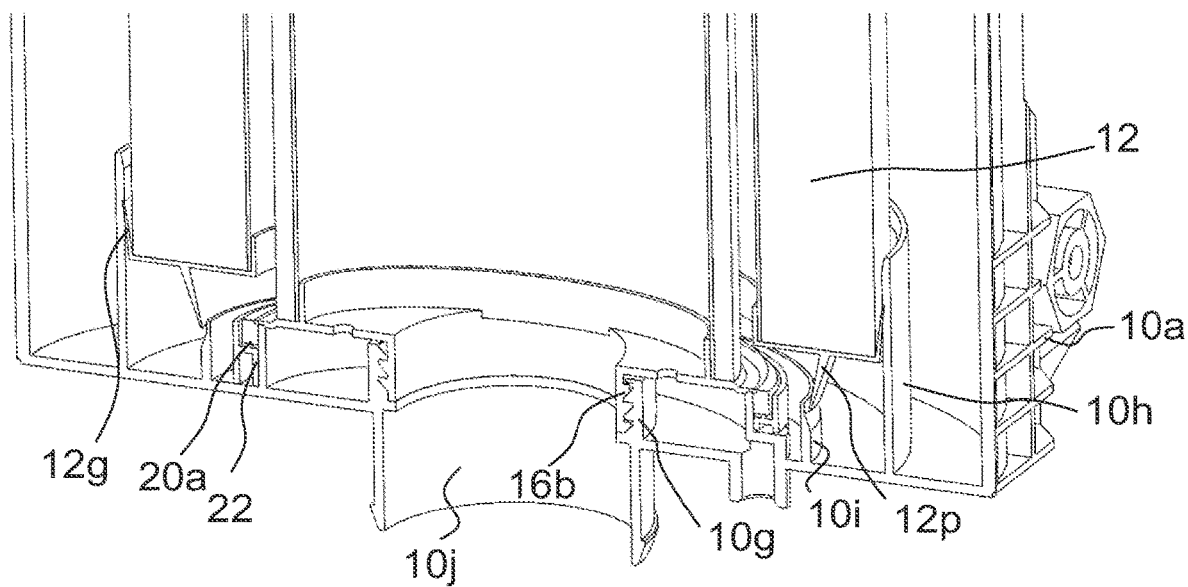
Figure 12:
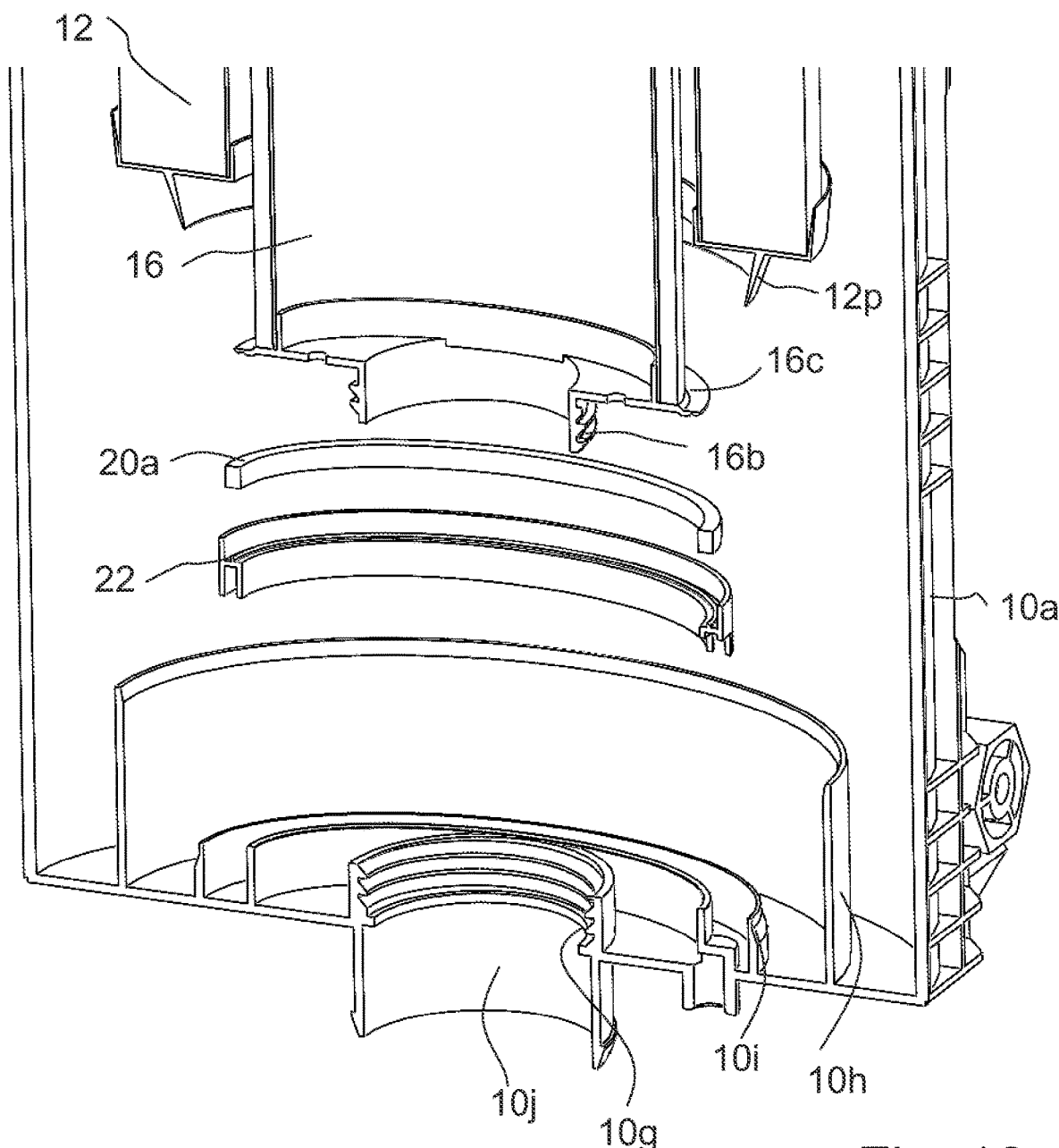

The present invention will be more fully understood and appreciated by reading the following Detailed Description in conjunction with the accompanying drawings, in which:

FIG. 1 a filter;

FIG. 2 an exploded view of a filter element and a filter pot of the filter according to FIG. 1;

FIG. 3 a longitudinal section of the filter with mounted filter element;

FIG. 4 a sectional view of a head portion of the filter element mounted in the filter housing;

FIG. 5 a filter according to an embodiment of the invention in a sectional view;

FIG. 6 a head portion of the filter according to the second embodiment of the invention in an exploded view;

FIG. 7 the head section of the filter according to the second embodiment with the housing cover in place;

FIG. 8 the head part of the filter according to the embodiment with fully locked locking element;

FIG. 9 an exploded view showing a filter element and a sup-port tube of the filter according to the second embodiment of the invention;

FIG. 10 a bottom part of the filter according to the embodiment with loosely inserted filter element and support tube partially screwed in;

FIG. 11 the bottom portion of the filter according to the second embodiment with the support tube fully screwed in; and FIG. 12 an exploded view of a bottom portion of the filter according to the second embodiment of the invention.

DETAILED DESCRIPTION OF THE INVENTION

FIG. 1 shows a filter. The filter comprises an oval filter housing 10 and a replaceable oval filter element 12 arranged in the filter housing 10 in the ready-to-use state.

The filter housing 10 comprises an oval housing pot 10a having a fluid inlet 10e, a fluid outlet 10j (illustrated on the bottom of the housing pot 10a, shown in FIGS. 3 and 5), and an opening 10b for inserting the filter element 12. A support tube 16 having an internal thread 16a is provided centrally in the housing pot 10a.

The filter is shown in FIG. 2 in an exploded view.

The housing pot 10a includes a main body 10c and an insert 10d having an upper rim forming or surrounding the opening 10b, and the fluid inlet 10e. A dust outlet valve 10f is provided at the bottom of the main body 10c. A further flow guide tube 10g may be provided in the fluid inlet 10e.

The filter element 12 comprises a respective annular upper end element 12a, a lower end element 12b, a support tube 12c (FIG. 2) made of a perforated or grid-like material, a filter fleece 12d and a locking element 14. The support tube 12c and the two end elements 12a, 12b enclose an inner space which forms the clean area of the filter.

In the Filter shown in FIGS. 1-4, the upper end element 12a of the filter element 12 also forms a housing cover for closing the opening 10b of the housing pot 10a into which the filter element 12 is inserted. The upper end element 12a is thus adapted in shape and size to the shape and size of the opening 10b of the housing pot 10a in such a way that it can sealingly close the opening 10b.

The lower end element 12b comprises a plate-shaped base plate 12e. A sealing lip 12g is integrally formed on an outer periphery of the base plate 12e from the material of the base plate, namely a reinforced, non-porous plastic, which sealing lip 12g abuts an inner wall at the bottom of the housing pot 10a in the assembled state (FIG. 3) and seals the clean region of the filter with respect to the raw region of the filter.

The upper end element 12a comprises a radially outer circumferential sealing lip 12i formed from a material of the housing cover, namely a reinforced plastic.

FIG. 3 shows the filter in a longitudinal section, and FIG. 4 shows a detailed view of an upper portion of the filter element 12 in an assembled state.

The filter fleece 12d is a nanofleece with corrugation that is bonded to the end elements 12a, 12b and to the support tube 12c, respectively.

A latching rib 12l is provided on an inner circumference of the support tube 12c, which engages with a latching groove 14m on an outer circumference of the locking member 14. The detent groove 14m and the detent rib 12l rotatably connect the locking member 14 to the upper end member 12b in a manner rotatable about the central axis of the filter member 12.

At an extension projecting into the interior of the filter housing 10, the locking element 14 includes a first thread 14a. The housing cup 10a comprises the inner support tube 16 projecting in a chimney-like manner from the bottom of the housing cup 10a and having the internal thread 16a, which engages the first thread 14a and connects the filter element 12 to the housing cup 10a in the assembled state shown in FIGS. 3 and 4.

To insert the filter element 12 into the housing pot 10a, the filter element 12 is inserted into the opening 10b and the locking element 14 is rotated clockwise so that the interengaging threads 14a, 16a pull the filter element 12 into the housing pot 10a or generate a thrust force that pushes the filter element 12 into the housing pot 10a and holds it there. In doing so, the threads 14a, 16a translate the rotational movement of the locking element 14 into the pushing force. At the same time, the sealing lips 12g, 12i on the lower and upper end elements 12a, 12b are pressed into their counter bearings (FIG. 3), the filter housing 10 is sealed and at the same time the filter element 12 is sup-ported radially outward in the filter housing 10 via the upper end element 12a. To release the filter element 12, the locking element 14 is turned counterclockwise until it can be pulled out. Via the further latching groove 14m and the further latching rib 12l, a tensile force exerted by the user and, if necessary, a tensile force generated or reinforced via the thread 14a, 16a can act directly on the support tube 12c or the end elements 12a, 12b.

FIGS. 5-12 show a filter according to an embodiment of the invention. The following description focuses on the differences to the filter of FIGS. 1-4. With regard to unchanged features, reference is made to the description for FIGS. 1-4.

As can be seen in FIGS. 5 and 12, a filter housing 10 of the filter according to the embodiment comprises, in addition to a housing pot 10a, a support tube 16 configured as a separate component which at its upper end forms an internal thread 16a for engagement with an external thread 14a of a locking element 14 and at its lower end forms a socket with an external thread 16b for engagement with an internal thread 10g of the housing pot 10a.

The support tube 16 may be formed as a one-piece injection-molded component or may comprise a tubular base body and pressed-on or glued-on end plates. The support tube 16 is designed to be air-permeable, for example with a perforated or lattice structure in the outer shell.

A housing cover 18 is designed as a separate component in this embodiment, but could also be designed integrally with the upper end element 12a of a filter element 12. The filter element 12 comprises at its lower end element 12b, which in the installed state faces the bottom of the housing pot 10a, a radially outer sealing lip 12g, which projects obliquely in a direction facing away from the bottom of the housing pot 10a, which, in the in-stalled configuration, bears against a cylinder-jacket-shaped flow guide wall 10h on the base of the housing pot 10a, and a radially inner sealing lip 12p which projects obliquely in a direction facing the base of the housing pot 10a and bears against a further, cylinder-jacket-shaped wall structure 10i on the base of the housing pot 10a. The wall structure 10i has a run-up slope on its radially outwardly oriented side (FIG. 12).

FIG. 6 shows a head portion of the filter according to the embodiment of the invention in an exploded view. The locking element 14 has a two-piece configuration and forms a torque-limiting mechanism. A lower element 14b of the locking element 14 includes the thread 14a and a sawtooth profile 14c formed on an inner wall, and an upper element 14d of the locking element 14 forms a hand-turn knob and includes an outer sawtooth profile 14e that engages the inner sawtooth profile 14c and latches over when a maximum torque is reached. The two elements 14b, 14d of the locking element 14 are rotatably connected to each other via a flange and a circumferential groove. Furthermore, the lower element 14b comprises a circumferential rib 14f above the thread 14a, which is designed to engage with an inner edge of an opening of the housing cover 18 and to rotatably support the locking element 14 in this way in the housing cover 18.

FIG. 7 shows the head portion of the filter according to the embodiment with the housing cover 18 attached. The thread 14a engages the internal thread 16a of the support tube 16 connected to the housing pot 10a, so that by screwing in the locking element 14, it is pulled into the housing pot 10a together with the housing cover 18, thus sealing the filter housing 10 tightly and at the same time pushing the filter element 12 inwards into the housing pot 10a. FIG. 8 shows the head part of the filter according to the second embodiment with fully locked locking element 14. The housing cover 18 completely closes the filter housing 10 and pushes the filter element into the housing pot.

FIG. 9 shows an exploded view with a filter element and a support tube of the filter according to the second embodiment of the invention.

FIG. 10 shows a bottom portion of the filter according to the embodiment with the filter element loosely inserted and the support tube partially screwed in. FIG. 11 shows the bottom area of the filter according to the embodiment with the support tube fully screwed in. When the filter element 12 is pushed in by turning the locking element 14, the sealing lip 12g comes into contact with the cylinder-jacket-shaped flow guide wall 10h at the bottom of the housing pot 10a, and the radially inner sealing lip 12p, which projects obliquely in a direction facing the bottom of the housing pot 10a, comes into contact with the run-up slope of the cylinder-jacket-shaped wall structure 10i at the bottom of the housing pot 10a and seals the filter housing on the clean side.

FIG. 12 shows an exploded view of a bottom portion of the filter according to the embodiment of the invention. Radially inside the wall structure 10i, an O-ring 20a is fixed on a base ring 22 on which a flange 16c of the support tube 16 rests when the latter is screwed with the external thread 16b into the internal thread 10g of the housing pot 10a.

LIST OF REFERENCE SIGNS

10 Filter housing
10a Housing cup
10b Opening
10c Main body
10d Insert
10e Fluid inlet
10f dust outlet valve
10e flow guide tube
10h flow guide wall
10i Wall structure
12 filter element
12a upper end element
12b lower end element
12c support tube
12d filter fleece
12e base plate
12f Connecting tube
12g Sealing lip
12j Opening
12p Sealing lip
14 Locking element
14a Thread
14m Locking groove
16 Support tube
16a Female thread
16b External thread
18 Housing cover

What is claimed is:
1. A filter, comprising:
a filter housing (10); and
a replaceable filter element (12) disposed in the filter housing (10) and having annular upper and lower closure members (12a, 12b) and an interior space, wherein the filter housing (10) forms a housing pot (10a) having a fluid inlet (10e), a fluid outlet, and an opening (10b) for insertion of the filter element (12);

a support tube (16) extending in the interior of the filter element (12) and connected to a bottom of the filter housing (10); and a locking member (14) adapted to engage the support tube (16) such that rotation of the locking member (14) will provide a force that will push the filter element (12) into the housing pot (10*a*) and hold the filter element (12) in the housing pot (10*a*) or will pull the filter element (12) out of the housing pot (10*a*);

wherein the filter element includes a radially inner sealing lip (12*p*) which projects obliquely in a direction facing the bottom of the housing pot (10*a*) and bears against a cylinder-jacket-shaped wall structure (10*i*) on the bottom of the housing pot (10*a*), and wherein the wall structure (10*i*) has a run-up slope on its radially outwardly oriented side.

2. A filter according to claim 1, wherein the locking member (14) and the support tube (16) have interengaging threads (14*a*, 16*a*) that translate a rotational movement of the locking element (14) into the thrust force.

3. A filter according to claim 2, wherein the locking member (14) comprises a torque-limiting mechanism.

4. A filter according to claim 1, wherein the upper closure member (12*a*) of the filter element (12) forms a housing cover for closing the opening (10*b*).

5. A filter according to claim 1, wherein the support tube (16) is screwed to a bottom of the housing pot (10*a*).

6. A filter according to claim 1, wherein one or both of the upper closure member (12*a*) and the lower close element (12*b*) and the support tube (12*c*) are connected by a snap-in connection.

7. A filter according to claim 1, wherein the upper end element (12*a*) supports the filter element (12) radially outwardly in the filter housing (10).

8. A filter according to claim 1, wherein the upper end element (12*a*) comprises a radially outwardly circumferential sealing lip (12*i*).

9. A filter according to claim 8, wherein the sealing lip (12*i*) is a reinforced plastic.

10. A filter according to claim 1, further comprising a connecting tube (12*f*) for connecting the upper and lower end elements (12*a*, 12*b*).

11. A filter according to claim 10, wherein the connecting tube (12*f*) is integrally formed with the upper or the lower end element (12*a*, 12*b*).

12. A filter according to claim 1, wherein the filter element (12) comprises a main body and the locking member (14) rotatably mounted in a housing cover (18) or the upper end element (12*a*) and having a first thread (14*a*) projecting into the interior of the filter housing (10), wherein the housing pot (10*a*) comprises an internal support tube (16) having a second thread (16*a*) adapted to engage the first thread (14*a*) and connect the filter element (12) to the housing pot (10*a*).

13. A filter element (12) for use in a filter according to claim 1.

* * * * *